United States Patent
Qi

(10) Patent No.: US 7,024,445 B2
(45) Date of Patent: Apr. 4, 2006

(54) METHOD AND APPARATUS FOR USE IN BOOTH-ENCODED MULTIPLICATION

(75) Inventor: Jieming Qi, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 544 days.

(21) Appl. No.: 10/039,867

(22) Filed: Dec. 20, 2001

(65) Prior Publication Data

US 2003/0120694 A1    Jun. 26, 2003

(51) Int. Cl.
*G06F 7/52* (2006.01)

(52) U.S. Cl. ..................................... 708/628

(58) Field of Classification Search ......... 708/628–630
See application file for complete search history.

(56) References Cited

U.S. PATENT DOCUMENTS

| | | | | |
|---|---|---|---|---|
| 4,813,008 A | * | 3/1989 | Shigehara et al. | 708/630 |
| 5,151,875 A | * | 9/1992 | Sato | 708/630 |
| 5,521,855 A | * | 5/1996 | Yamazaki | 708/628 |
| 6,065,032 A | * | 5/2000 | Nicol | 708/628 |
| 6,301,599 B1 | * | 10/2001 | Chehrazi et al. | 708/628 |
| 6,622,154 B1 | * | 9/2003 | Hayashi et al. | 708/628 |

OTHER PUBLICATIONS

Abut-Khater et al., "Circuit Techniques for CMOS Low-Power High Performance Multipliers", IEEE Journal of Solid-State Circuits, vol. 31, No. 10, Oct. 1996, pp. 1535-1546.

Goto et al., "A 4.1-ns Compact 54×54-b Multiplier Utilizing Sign-Select Booth Encoders", IEEE Journal of Solid-State Circuits, vol. 32, No. 11 Nov. 1997; pp. 1676-1681.

Ohkubo et al., "A 4.4 ns CMOS 54×54-b Multiplier Using Pass-Transistor Multiplexer", IEEE Journal of Solid-State Circuits, vol. 30, No. 3, Mar. 1995, pp. 251-257.

Yeh et al., "High-Speed Booth Encoded Parallel Multiplier Design" IEEE Transactions on Computers, vol. 49, No. 7, Jul. 2000, pp. 692-710.

* cited by examiner

*Primary Examiner*—Tan V. Mai
(74) *Attorney, Agent, or Firm*—Wolf, Greenfield & Sacks, P.C.

(57) ABSTRACT

A new partial product bit generator is used to generate a partial product bit $PPj_i$. In some embodiments, the partial product bit generator generates the partial product bit $PPj_i$ from intermediate signals that are able to be generated concurrently, for example in two levels of combinatorial logic. The partial product bit $PPj_i$ is then able to be generated from the intermediate signal, for example in only one level of combinatorial logic. In such embodiments, a long series of combinatorial logic operations is not required.

43 Claims, 13 Drawing Sheets

$$PPj_i = (a_i X_1 + a_{i-1} X_2) \oplus N \quad \text{eq. (1)}$$

where $$X_1 = b_j \oplus b_{j-1} \quad \text{eq. (2)}$$

$$X_2 = \overline{b_{j+1}} \, b_j \, b_{j-1} + b_{j+1} \, \overline{b_j} \, \overline{b_{j-1}} \quad \text{eq. (3)}$$

$$N = b_{j+1} \quad \text{eq. (4)}$$

FIG. 4A
(Prior Art)

| $b_{j+1}$ | $b_j$ | $b_{j-1}$ | $X_1$ | $X_2$ | N | $PPj_i$ | PPj |
|---|---|---|---|---|---|---|---|
| 0 | 0 | 0 | 0 | 0 | 0 | 0 | 0 |
| 0 | 0 | 1 | 1 | 0 | 0 | $a_i$ | A |
| 0 | 1 | 0 | 1 | 0 | 0 | $a_i$ | A |
| 0 | 1 | 1 | 0 | 1 | 0 | $a_{i-1}$ | 2A |
| 1 | 0 | 0 | 0 | 1 | 1 | $\overline{a_{i-1}}$ | -2A |
| 1 | 0 | 1 | 1 | 0 | 1 | $\overline{a_i}$ | -A |
| 1 | 1 | 0 | 1 | 0 | 1 | $\overline{a_i}$ | -A |
| 1 | 1 | 1 | 0 | 0 | 1 | 0 * see note (1) | 0 * see note (1) |

Note (1)
In practice for the case of $b_{j+1} \, b_j \, b_{j-1}$ = 1, 1, 1, the partial product bit $PPj_i$ is frequently set equal to 1 in accordance with eq. (1) and therefore, the partial product PPj is equal to 1,...,1. However, the net effect of the partial product bit $PPj_i$ and the partial product PPj to the adder 24 is 0 because a sign bit of 1 is added to the LSB of the partial product PPj during compressing in the adder.

FIG. 4B
(Prior Art)

$$PP_{ji} = s_{1,-1} aa_{1,-1} + s_2 aa_2 + s_{-2} aa_{-2} \quad \text{eqn. (5)}$$

where
$$s_{1,-1} = b_j \oplus b_{j-1} \quad \text{eqn. (6)}$$
$$s_2 = b_j \overline{b_{j-1}} \quad \text{eqn. (7)}$$
$$s_{-2} = \overline{b_j} \, b_{j-1} \quad \text{eqn. (8)}$$
$$aa_{1,-1} = a_i \oplus b_{j+1} \quad \text{eqn. (9)}$$
$$aa_2 = a_{i-1} \overline{b_{j+1}} \quad \text{eqn. (10)}$$
$$aa_{-2} = \overline{a_{i-1}} \, b_{j+1} \quad \text{eqn. (11)}$$

FIG. 7A

| $b_{j+1}$ | $b_j$ | $b_{j-1}$ | $s_{1,-1}$ | $s_2$ | $s_{-2}$ | $aa_{1,-1}$ | $aa_2$ | $aa_{-2}$ | $PPj_i$ | $PPj$ |
|---|---|---|---|---|---|---|---|---|---|---|
| 0 | 0 | 0 | 0 | 0 | 0 | $a_i$ | $a_{i-1}$ | 0 | 0 | 0 |
| 0 | 0 | 1 | 1 | 0 | 1 | $a_i$ | $a_{i-1}$ | 0 | $a_i$ | A |
| 0 | 1 | 0 | 1 | 1 | 0 | $a_i$ | $a_{i-1}$ | 0 | $a_i$ | A |
| 0 | 1 | 1 | 0 | 1 | 0 | $a_i$ | $a_{i-1}$ | 0 | $a_{i-1}$ | 2A |
| 1 | 0 | 0 | 0 | 0 | 1 | $\overline{a_i}$ | 0 | $\overline{a_{i-1}}$ | $\overline{a_{i-1}}$ | -2A |
| 1 | 0 | 1 | 1 | 0 | 0 | $\overline{a_i}$ | 0 | $\overline{a_{i-1}}$ | $\overline{a_i}$ | -A |
| 1 | 1 | 0 | 1 | 0 | 0 | $\overline{a_i}$ | 0 | $\overline{a_{i-1}}$ | $\overline{a_i}$ | -A |
| 1 | 1 | 1 | 0 | 1 | 0 | $\overline{a_i}$ | 0 | $\overline{a_{i-1}}$ | 0 | 0 |

FIG. 7B

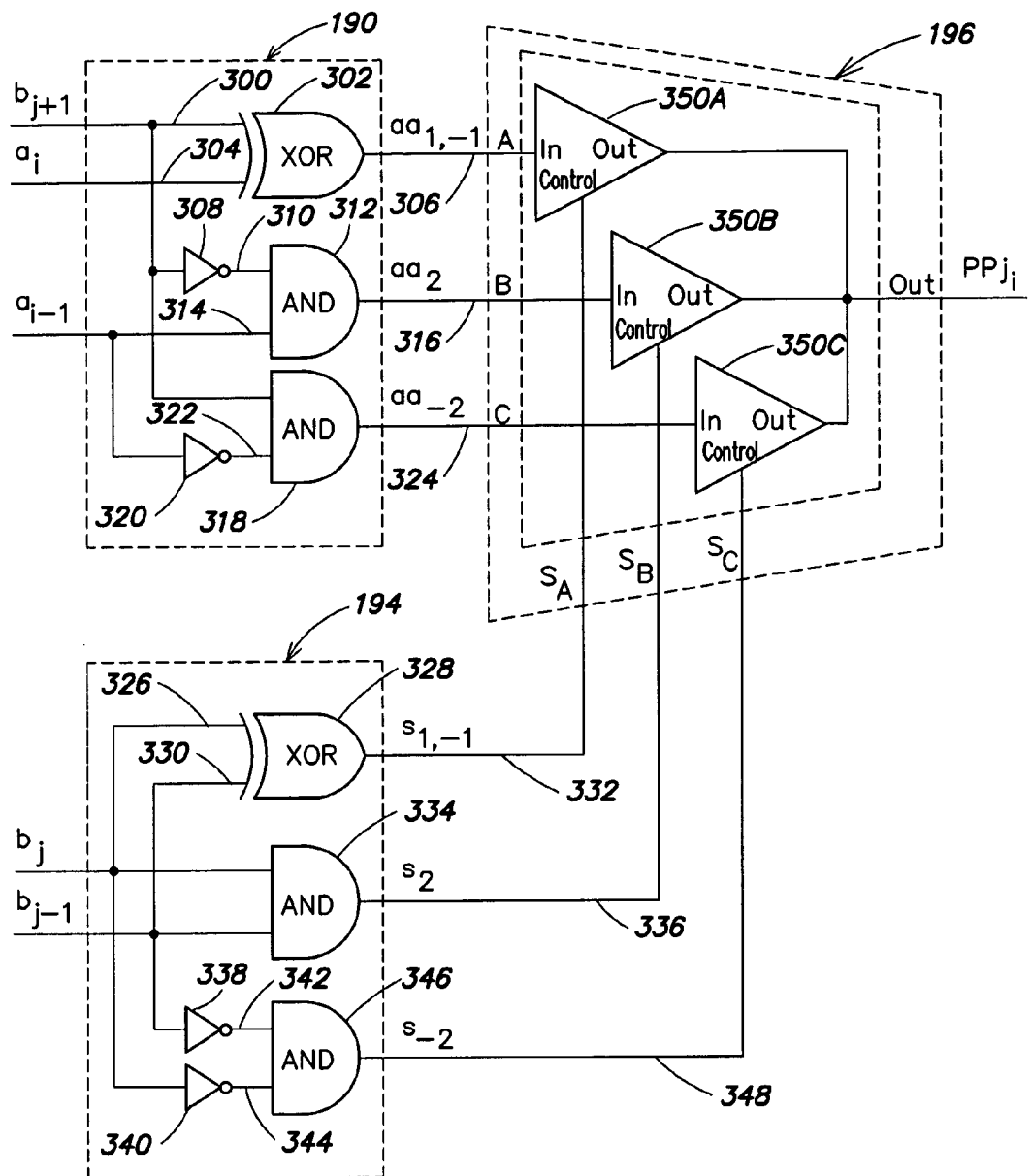
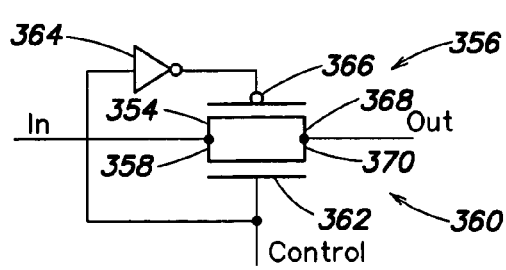
FIG. 9
FIG. 10

METHOD AND APPARATUS FOR USE IN BOOTH-ENCODED MULTIPLICATION

FIELD OF THE INVENTION

The present invention relates to data processors, more particularly, to methods and apparatus for booth-encoded multiplication.

BACKGROUND OF THE INVENTION

Data processors, for example microprocessors and digital signal processors, are commonly called upon to perform many multiplication operations each second. Consequently, data processors often include one or more multipliers in order to perform such operations efficiently.

Multiplication is often carried out by (1) generating partial products, and (2) summing the partial products. As to generating partial products, two different techniques are commonly used. The first technique uses 2-input AND gates. The second technique uses booth encoding. Compared to the 2-input AND gates method, the booth encoding method results in fewer partial products. Because there are fewer partial products, fewer summing operations are needed to generate the product.

A multiplier that uses booth encoding techniques is referred to herein as a booth-encoded multiplier. FIG. 1 shows an example of a booth-encoded multiplier 20. The booth-encoded multiplier 20 is made up of a booth-encoded partial product generator unit 22 and an adder 24. The partial product generator unit 22 receives a multiplicand A and a multiplier B. The multiplicand A is received through an operand bus 32. The multiplier B is received through an operand bus 34.

The multiplicand A and the multiplier B are typically each multi-bit digital signals. For example, the multiplicand may have bits $a_{n-1}$, $a_{n-2}$, ... $a_1$, $a_0$, where bit $a_{n-1}$ is the most significant bit (MSB) and bit $a_0$ is the least significant bit (LSB). The multiplier B may have bits $b_{n-1}$, $b_{n-2}$, ... $b_1$, $b_0$, where bit $b_{n-1}$ is the MSB and bit $b_0$ is the LSB. There is no requirement for the multiplicand A to have the same number of bits as the multiplier B.

The partial product generator unit 22 generates m partial products, PP0–PPm-1. Each of the partial products is a multi-bit digital signal. For example, the partial product PP0 may have bits $PP0_{k-1}$, $PP0_{k-2}$, ... $PP0_1$, $PP0_0$, where bit $PP0_{k-1}$ is the MSB and bit $PP0_0$ is the LSB. Likewise for the partial products PP1–PPm-1. For example, the partial product PPm-1 may have bits $PPm\text{-}1_{k-1}$ ... $PPm\text{-}1_0$, where bit $PPm\text{-}1_{k-1}$ is the MSB and bit $PPm\text{-}1_0$ is the LSB.

The partial products PP0–PPm-1 are supplied to the adder 24. It should be understood that the adder 24 is also supplied with sign bits, which are generated from the multiplier B directly, but which are not shown. The adder 24 determines the sum, which is indicative of the product of the multiplicand A and the multiplier B. The adder 24 outputs the result, i.e., Product, on a data bus 48. It should also be understood that the adder is typically made-up of a partial product compression tree (e.g., made up of carry save adders) and a fast two operand adder (e.g., such as a carry look ahead adder), which are not shown.

FIG. 2 shows a block diagram of one prior art implementation of the booth-encoded partial product generator unit 22 (FIG. 1). The prior art partial product generator unit 22 includes m partial product generators, four of which are shown, i.e., 60A, 60B, 60C and 60D. The m partial product generators are all identical to one another. Each partial product generator has inputs A, $b_{j+1}$, $b_j$, $b_{j-1}$, and an output, PPj. The A input of each of the partial product generators receives the multiplicand A. The $b_{j+1}$, $b_j$, $b_{j-1}$ inputs receive groups of bits of the multiplier B. The PPj output of each partial product generator supplies one of the partial products. More specifically, the partial product generator 60A receives the multiplicand A and multiplier bits $b_1$, $b_0$ (input $b_{j-1}$ is supplied with 0, i.e., a signal having a logic low state), and supplies the partial product PP0. The partial product generator 60B receives the multiplicand A and bits $b_3$, $b_2$, $b_1$ of the multiplier B, and supplies the partial product PP1. The partial product generator 60C receives the multiplicand A and bits $b_5$, $b_4$, $b_3$ of the multiplier B and supplies the partial product PP2, and so on. The partial product generator 60D receives the multiplicand A and bits $b_{n-1}$, $b_{n-2}$, $b_{n-3}$ of the multiplier B and supplies the partial product PPm-1.

Booth-encoded multipliers are sometimes characterized as to its radix value (e.g., 2, 4, 8, etc.), wherein the radix value is defined by the following equation:

$$\text{radix value} = 2^{q-1}$$

and where the value of q is equal to the number of multiplier bits used to generate each partial product. As to the implementation of FIG. 2, the partial product generators use three multiplier bits (i.e., $b_{j+1}$, $b_j$, $b_{j-1}$) to generate the partial product, and therefore, the implementation shown in FIG. 2 is a radix 4 multiplier (radix value=$2^{(3-1)}$=4). Note that for a radix 4 booth-encoded multiplier, the number of partial products (i.e. the value of m) generated by the booth-encoded partial product generator unit 22 is equal to one half the number of bits in the multiplier B, rounded up to the nearest whole number.

FIG. 3 shows a typical implementation 60 for the partial product generators 60A–60D (FIG. 2). This implementation 60 includes k partial product bit generators, four of which are shown, i.e., 70A, 70B, 70C and 70D. Note that in a radix 4 booth-encoded multiplier, the value of k is equal to the number of bits in the multiplicand A. The partial product generators 70A–70D are all identical to one another. Each partial product generator has two sets of inputs and one output. The first set of inputs is $a_i$, $a_{i-1}$. The second set of inputs is $b_{j+1}$, $b_j$, $b_{j-1}$. The output is $PPj_i$. The $a_i$, $a_{i-1}$ inputs of each partial product bit generator are supplied with a group of bits of the multiplicand A. The $b_{j+1}$, $b_j$, $b_{j-1}$ inputs are supplied with the signals input to the $b_{j+1}$, $b_j$, $b_{j-1}$ inputs of the partial product generator 60. (The signals input to the $b_{j+1}$, $b_j$, $b_{j-1}$ inputs are in some instances hereafter referred to as bits $b_{j+1}$, $b_j$, $b_{j-1}$ of the multiplier B or simply multiplier bits $b_{j+1}$, $b_j$, $b_{j-1}$). The $PPj_i$ output of each partial product bit generator supplies one of the bits of the partial product PPj. More specifically, the partial product bit generator 70A receives bit $a_0$ of the multiplicand A and bits $b_{j+1}$, $b_j$, $b_{j-1}$ of the multiplier B, and supplies bit $PPj_0$ of the partial product PPj. The partial product bit generator 70B receives bits $a_1$, $a_0$ of the multiplicand and bits $b_{j+1}$, $b_j$, $b_{j-1}$ of the multiplier B, and supplies bit $PPj_1$ of the partial product PPj, and so on. The partial product bit generator 70C receives bits $a_{n-2}$, $a_{n-3}$ of the multiplicand A and bits $b_{j+1}$, $b_j$, $b_{j-1}$ of the multiplier B, and supplies bit $PPj_{k-2}$ of the partial product PPj. The partial product bit generator 70D receives bits $a_{n-1}$, $a_{n-2}$ of the multiplicand A and bits $b_{j+1}$, $b_j$, $b_{j-1}$ of the multiplier B, and supplies bit $PPj_{k-1}$ of the partial product PPj.

FIGS. 4A and 4B show logic equations and a truth table, respectively, for each of the partial product bit generators 70A–70D (FIG. 3). The equations of FIG. 4A, which are reproduced below for the convenience of the reader, show that the logic state of the partial product bit $PPj_i$ is determined as follows:

$$PPj_i = (a_i X_1 + a_{i-1} X_2) \text{XOR } N \qquad \text{eq. (1)}$$

where $$X_1 = b_j \text{ XOR } b_{j-1} \qquad \text{eq. (2)}$$

$$X_2 = \text{NOT}(b_{j+1}) b_j b_{j-1} + b_{j+1} \text{NOT}(b_j) \text{NOT }(b_{j-1}) \qquad \text{eq. (3)}$$

and $$N = b_{j+1} \qquad \text{eq. (4).}$$

Note that the logic state of the partial product bit $PPj_i$ depends on the logic state of $X_1$, $X_2$, and $N$ (where $X_1$, $X_2$, and N are intermediate signals), and on the logic state of the signals input to the $a_i$, $a_{i-1}$ inputs. (The signals input to the $a_i$, $a_{i-1}$ inputs are in some instances hereafter referred to as bits $a_i$, $a_{i-1}$ of the multiplicand A or simply multiplicand bits $a_i$, $a_{i-1}$). In the steady state, the logic state of $X_1$ depends only on the logic state of two multiplier bits (i.e., $b_j$ and $b_{j-1}$). The logic state of $X_2$ depends only on the logic state of three multiplier bits (i.e., $b_{j+1}$, $b_j$, $b_{j-1}$). The logic state of N depends only on the logic state of one multiplier bit (i.e., $b_{j+1}$).

Referring now to FIG. 4B, the truth table has eight columns. More specifically, the table has three columns for the inputs (multiplier bits $b_{j+1}$, $b_j$, $b_{j-1}$), three columns for the intermediate signals ($X_1$, $X_2$, N), one column for the output from the partial product bit generators ($PPj_i$), and one column for output from the partial product generator (PPj).

The table has eight rows, one for each possible combination of the multiplier bits $b_{j+1}$, $b_j$, $b_{j-1}$. From the truth table, it can be seen that if the multiplier bits $b_{j+1}$, $b_j$, $b_{j-1}$ have logic states 0, 0, 0 respectively, then each of the partial product bit generators outputs a 0 regardless of the logic states of the multiplicand bits $a_i$, $a_{i-1}$. (Recall that each of the partial product bit generators are supplied with the same group of multiplier bits $b_{j+1}$, $b_j$, $b_{j-1}$). Consequently, the partial product PPj may be viewed as being equivalent to 0.

If the multiplier bits $b_{j+1}$, $b_j$, $b_{j-1}$ have logic states 0, 0, 1, or 0, 1, 0, then each of the partial product bit generators outputs a logic state equal to that of the multiplier bit supplied to its $a_i$ input. Consequently, the partial product PPj is equivalent to the multiplicand A, i.e., A.

If the multiplier bits $b_{j+1}$, $b_j$, $b_{j-1}$ have logic states 0, 1, 1, then each of the partial product bit generators outputs a logic state equal to that of the multiplier bit supplied to its $a_{i-1}$ input. Consequently, the partial product PPj is equivalent to the multiplicand A multiplied by two, i.e., 2A.

If the multiplier bits $b_{j+1}$, $b_j$, $b_{j-1}$ have logic states 1, 0, 0, then each of the partial product bit generators outputs a logic state equal to the inverse of the logic state of the multiplier bit supplied to its $a_{i-1}$ input. Consequently, the partial product PPj is equivalent to the multiplicand A multiplied by negative two, i.e., −2A.

If the multiplier bits $b_{j+1}$, $b_j$, $b_{j-1}$ have logic states 1, 0, 1, or 1, 1, 0 then each of the partial product bit generators outputs a logic state equal to the inverse of the logic state of the multiplier bit supplied to its as input. Consequently, the partial product PPj is equivalent to the multiplicand A multiplied by negative one, i.e. −A.

If the multiplier bits $b_{j+1}$, $b_j$, $b_{j-1}$ have logic states 1, 1, 1, then each of the partial product bit generators outputs a 1. This results in bits $PPj_{k-1}$ through $PPj_0$ of the partial product PPj having logic states equal to 1, . . . , 1, respectively.

However, the net effect of the partial product PPj to the downstream adder 24 becomes 0, . . . , 0 because a sign bit equal to 1 is added to the LSB of the partial product PPj by the compression tree in the adder. Consequently, the result is the same as if each of the partial product bit generators had actually output a 0, i.e., PPj equal to 0.

FIG. 5A shows one implementation 70 of the partial product bit generators 70A–70D. This implementation 70 has three circuits 90, 92, 94. The first circuit 90 receives the signals $b_j$, $b_{j-1}$ and generates the signal $X_1$. The second circuit 92 receives the signals $b_{j+1}$, $b_j$, $b_{j-1}$ and generates the signal $X_2$. The third circuit 94 receives the signals $a_i$, $a_{i-1}$ and the outputs from the first and the second circuits 90, 92 and generates the partial product bit $PPj_i$.

Each of the three circuits 90, 92, 94 makes use of combinatorial logic. This combinatorial logic is to be discussed hereinbelow. First however, a definition for the term "combinatorial logic" and a basis for characterizing circuits with combinatorial logic is to be provided.

The term "combinatorial logic", as used herein, is defined as a circuit (or a circuit portion) that receives two or more logic signals and provides one or more logic signal in response thereto. Combinatorial logic is typically used to perform a sequence (or multiple sequences) of combinatorial logic operations.

Combinatorial logic may take many forms including but not limited to logic gates(s). Examples of logic gates include AND, NAND, OR, NOR, EXCLUSIVE AND (i.e., XAND), EXCLUSIVE NAND (i.e., XNAND), EXCLUSIVE OR (i.e., XOR), EXCLUSIVE NOR (i.e., XNOR) logic gates, and combinations thereof. However, it should be understood that a conventional inverter gate, which receives only a single logic input, is not considered combinatorial logic. Logic gates may or may not employ standard logic family circuitry. Example of logic families include but are not limited to TTL, DTL, ECL, CMOS, wired logic and combinations thereof.

Other types of circuitry (i.e., non logic-gate types of circuits) to perform combinatorial logic include, but are not limited to, pass transistor arrangements and transmission gates.

Combinatorial logic circuits may be implemented in any suitable technology including but not limited to bipolar technology, CMOS technology, and combinations thereof.

Circuits (and data paths within circuits) with combinatorial logic are sometimes characterized as to their "number of levels of combinatorial logic". The number of levels of combinatorial logic in a data path is equal to the number of basic combinatorial logic operations from the inputs of the data path to the output of the data path. Basic combinatorial logic operations are defined herein as: AND, OR, NAND, and NOR. Similarly, the number of levels of combinatorial logic in a circuit is equal to the number of basic combinatorial logic operations in the longest data path within the circuit. The longest data path within the circuit is the data path having the highest number of basic combinatorial logic operations from the inputs of the data path to the output of the data path.

Note that some logic gates, by themselves, comprise more than one level of combinatorial logic. For example, an XOR gate (which is typically implemented using the combinatorial operations X NOT (Y)+YNOT (X)), typically comprises at least two levels of combinatorial logic.

Referring again to FIG. 5A, with the above definitions in mind, it should now be recognized that the partial product bit generator shown in FIG. 5A has exactly six levels of combinatorial logic. The first circuit 90 has two levels of combinatorial logic (recall that the XOR gate is made up of two levels of combinatorial logic). The second circuit 92 has two levels of combinatorial logic (the AND gates 98, 100 make up the first level, the OR gate 104 makes up the second level), which are in parallel with the two levels in the first circuit. The third circuit 94 has four levels of combinatorial logic (the AND gates 106, 110 make up the first level, the OR gate 112 makes up the second level, and the XOR gate 118 makes up the third level). Note that in some embodiments, signals having logic states equal to the inverse of the logic states of the multiplier bits $b_j$, $b_{j-1}$ may be generated and made globally available with the partial product generator, thereby eliminating the need for the inverters 120, 122, 124 in the second circuit 92.

FIG. 5B shows another implementation 70 of the partial product bit generators 70A–70D. The implementation of FIG. 5B is similar to the implementation of FIG. 5A in that the implementation of FIG. 5B has first, second, and third logic circuits 130, 132, 134 that generate the signals $X_1$, $X_2$, and $PPj_i$, respectively. One difference between the implementation of FIG. 5B and the implementation of FIG. 5A is that the implementation of FIG. 5B includes a multiplexer 146. The multiplexer 146 is made up of a pass transistor arrangement (not shown) and is therefore referred to herein as a pass transistor multiplexer.

As in the implementation of FIG. 5A, the implementation of FIG. 5B has exactly six levels of combinatorial logic. In particular, the first circuit 130 has two levels of combinatorial logic (the XOR gate 136 is made up of two levels of combinatorial logic). The second circuit also has two levels of combinatorial logic (the NOR gates 142, 152 make up the first level of combinatorial logic and the multiplexer 146 makes up the second level of combinatorial logic), which are in parallel with the two level in the first circuit. The third circuit 134 has four levels of logic (the NAND gates 158, 160 make up the first level, the NAND gate 162 makes up the second level, and the XOR gate 164 makes up the third and fourth levels). Note that the inverters 138, 140 in the first circuit 130 and the inverters 166, 168 help provide drive capability. Note that in some embodiments, signals having logic states equal to the inverse of the logic states of the multiplier bits $b_j$, $b_{j-1}$ may be generated and made globally available with the partial product generator, thereby eliminating the need for the inverters 148, 150 in the second circuit 132.

Booth-encoded multipliers often require less area than multipliers that generate partial products using 2-input NAND gates. Thus the use of booth-encoded multipliers can facilitate a reduction in the size of data processors and/or help to make room to incorporate other features into data processors.

Nevertheless, enhancements in booth-encoded methods are desired. For example, it would be advantageous to increase the operational speed and/or reduce the amount of power required for booth-encoded methods. A further reduction in the area requirements would also be desirable.

SUMMARY OF THE INVENTION

The present invention is directed to new methods and apparatus for use in generating partial products using booth-encoding.

According to a first aspect of the present invention, a partial product bit generator circuit has less than six levels of combinatorial logic.

According to another aspect of the present invention, a method for use in performing multiplication includes generating a partial product bit signal in response to a group of multiplicand bits and a group of multiplier bits using less than six levels of combinatorial logic.

According to another aspect of the present invention, a partial product bit generator circuit includes means for generating a partial product bit signal in response to a group of multiplicand bits and a group of multiplier bits using less than six levels of combinatorial logic.

According to another aspect of the present invention, a method for generating a partial product bit includes generating at least three digital signals in response to a group of multiplicand bits and a first subset of a group of multiplier bits, and further generating at least three select signals in response to a second subset of the group of multiplier bits. Each of the at least three select signals is associated with a respective one of the at least three digital signals. Only one of the select signals has a logic state that is asserted. A partial product bit is generated in response to the digital signal associated with the select signal having the asserted logic state.

According to another aspect of the present invention, an apparatus for generating a partial product bit includes a first circuit that outputs at least three digital signals in response to a group of the multiplicand bits and a first subset of a group of the multiplier bits. A second circuit outputs at least three select signals in response to a second subset of the group of multiplier bits. Each of the at least three select signals is associated with a respective one of the at least three digital signals. Only one of the at least three select signals has a logic state that is asserted. A third circuit, outputs a partial product bit in response to the digital signal that is associated with the select signal having the asserted logic state.

According to another aspect of the present invention, an apparatus for generating a partial product bit includes a first circuit that outputs a first set of output signals in response to a group of the multiplicand bits and a first subset of a group of the multiplier bits. A second circuit outputs a second set of output signals in response to a second subset of the group of multiplier bits. The second subset of the group of multiplier bits is disjoint from the first subset of the group of multiplier bits A third circuit, outputs a partial product bit in response to the first set of output signals and the second set of output signals.

According to another aspect of the present invention, a method for generating a partial product bit includes generating a first set of output signals in response to the group of multiplicand bits and a first subset of the group of multiplier bits, and further generating a second set of output signals in response to a second subset of the group of multiplier bits. The second subset of the group of multiplier bits is disjoint from the first subset of the group of multiplier bits. A partial product bit is generated in response to the first set of output signals and the second set of output signals.

According to another aspect of the present invention, an apparatus for generating a partial product bit includes means for generating at least three digital signals in response to a group of multiplicand bits and a first subset of a group of multiplier bits, and further includes means for generating at least three select signals in response to a second subset of the group of multiplier bits. Each of the at least three select signals is associated with a respective one of the at least three digital signals. The apparatus further includes means for generating a partial product bit in response to the digital signal associated with the select signal having the asserted logic state.

According to another aspect of the present invention, a partial product bit generator includes means for generating a first set of output signals in response to the group of multiplicand bits and a first subset of the group of multiplier bits, and further includes means for generating a second set of output signals in response to a second subset of the group of multiplier bits. The second subset of the group of multiplier bits is disjoint from the first subset of the group of multiplier bits. The partial product bit generator further includes means for generating a partial product bit signal in response to the first set of output signals and the second set of output signals.

According to another aspect of the present invention, a partial product bit generator receives three multiplier bits, $b_{j+1}$, $b_j$, $b_{j-1}$ and two multiplicand bits, $a_i$, $a_{i-1}$, and outputs a partial product bit, wherein a longest delay path through the partial product bit generator circuit is substantially equivalent to an XOR gate and a three input pass transistor multiplexer.

One or more embodiments of one or more aspects of the present invention may be used to reduce propagation delay, the power and/or the area required to generate partial products in comparison to the prior art booth-encoded methods described above.

For example, in some embodiments, a partial product bit generator generates a partial product using fewer levels of combinatorial logic than the prior art partial product bit generators of FIGS. 5A, 5B. Fewer levels of combinatorial logic helps to reduce the delay through the partial product bit generator, and thereby helps increase the speed of a multiplier, which may help improve system performance, and in some situations, may help enable system designers to meet system requirements with fewer multipliers, thereby helping to reduce the cost, size and/or power consumption of a data processor system.

In some of such embodiments, the partial product bit generator generates the partial product bit $PPj_i$ from intermediate signals that are able to be generated concurrently, for example in two levels of combinatorial logic. The partial product bit $PPj_i$ is then able to be generated from the intermediate signal, for example in only one level of combinatorial logic. Thus, unlike the prior art partial product bit generators shown in FIGS. 5A, 5B, a long series of combinatorial logic operations is not required It should be recognized, however, that there is no requirement that any aspects of the present invention address the shortcomings of the prior art.

BRIEF DESCRIPTION OF THE DRAWINGS

FIGS. 4A and 4B show logic equations and a truth table, respectively, for the partial product bit generator of FIG. 3;

FIGS. 7A and 7B show a truth table and logic equations, respectively, for one embodiment of the partial product bit generator of FIG. 6;

FIG. 9 is a diagram, which is part logic diagram and part circuit diagram, for one embodiment of the circuits of FIG. 8;

FIG. 10 shows one embodiment of the transmission gates of the multiplexer circuit of FIG. 9;

DETAILED DESCRIPTION

Figure 6:
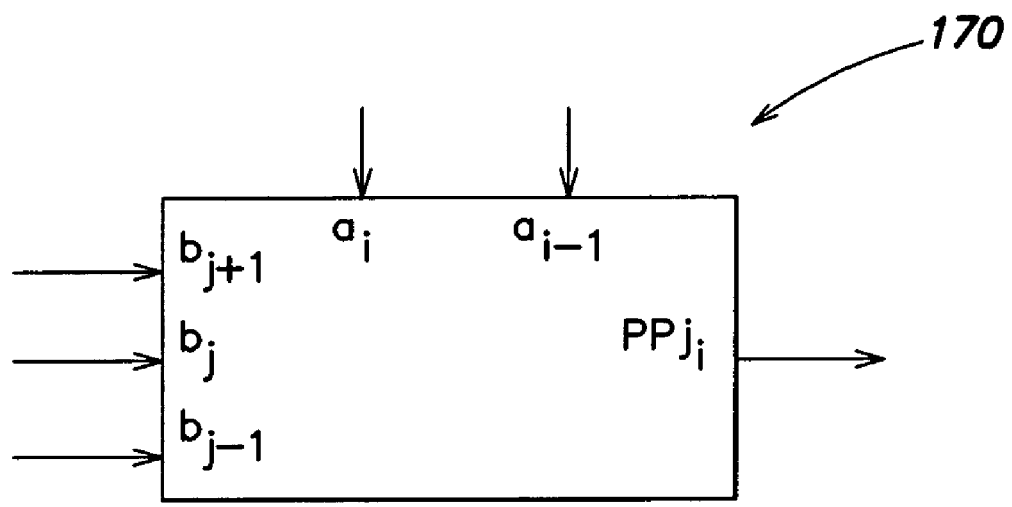
FIG. 6 shows a representation of a new booth-encoded partial product bit generator according to one embodiment of the present invention.

FIG. 6 shows a representation of a new booth-encoded partial product bit generator 170 according to one embodiment of the present invention.

As with the partial product bit generators 70A–70D (FIGS. 3–5), the partial product generator 170 has two sets of inputs and one output. The first set of inputs is indicated by $a_i$, $a_{i-1}$. The second set of inputs is indicated by $b_{j+1}$, $b_j$, $b_{j-1}$. The output is indicated by $PPj_i$. The $a_i$, $a_{i-1}$ inputs are intended to receive a group of bits of a multiplicand. The $b_{j+1}$, $b_j$, $b_{j-1}$ inputs are intended to receive a group of bits of a multiplier. The $PPj_i$ output provides a bit of a partial product.

Figure 3:
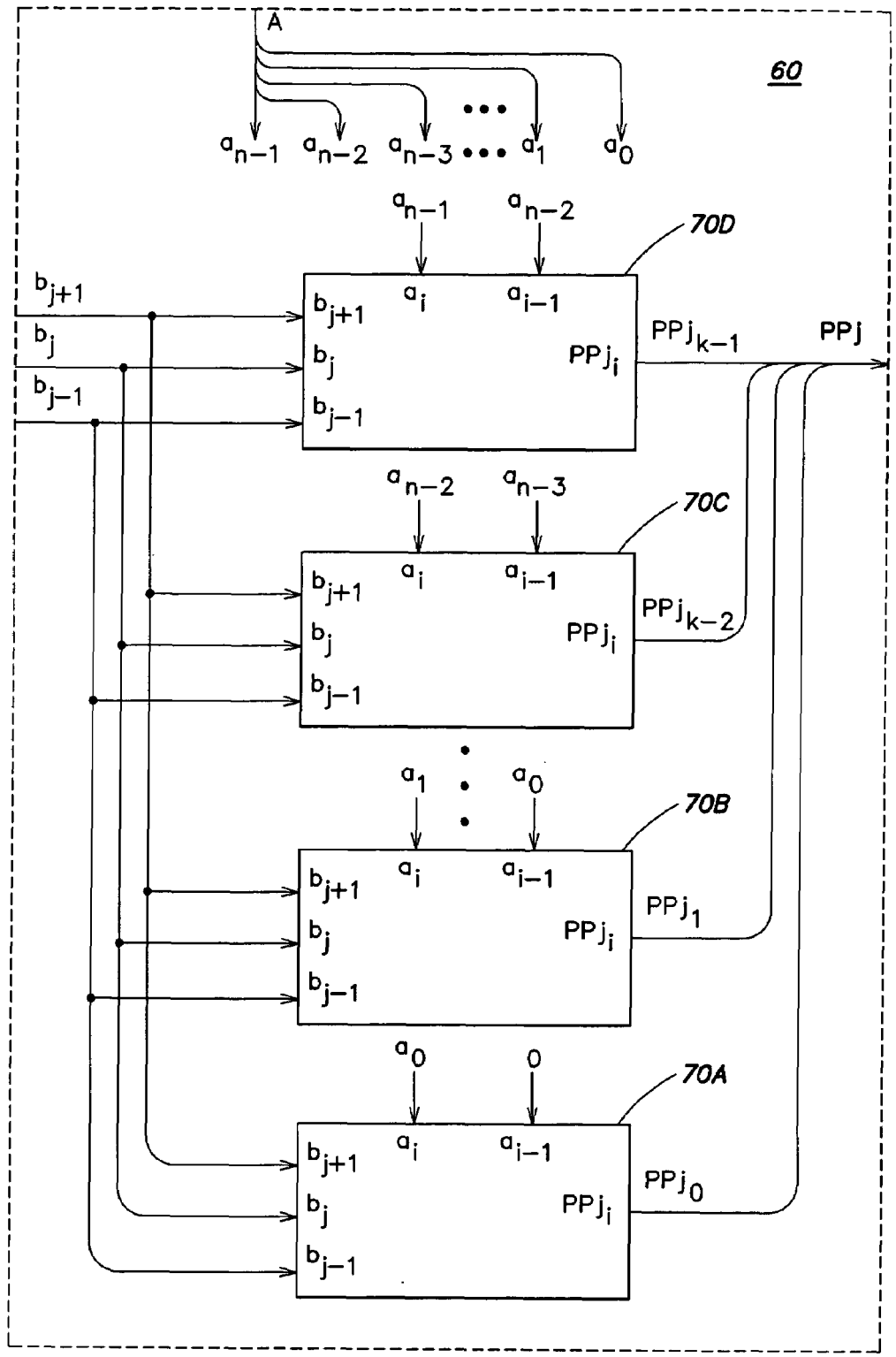
FIG. 3 is a block diagram of the partial product generators shown in FIG. 2.

It should be appreciated, in view of the discussion hereinbelow, that for a given set of inputs, the output of the partial product bit generator 170 is substantially equivalent to that which would be produced by the partial product bit generators 70A–70D (FIGS. 3–5).

FIGS. 7A and 7B show logic equations and a truth table, respectively, for one embodiment of the new partial product bit generator 170. The equations of FIG. 7A, which are reproduced below for the convenience of the reader, show that in this embodiment, the logic state of the partial product bit $PPj_i$ is determined as follows:

$$PPj_i = (s_{1,-1} aa_{1,-1} + s_2 aa_2 + s_{-2} aa_{-2}) \qquad \text{eq. (5)}$$

where $$s_{1,-1} = b_j \text{ XOR } b_{j-1} \qquad \text{eq. (6)}$$

$$s_2 = b_j b_{j-1} \qquad \text{eq. (7)}$$

$$s_{-2} = \text{NOT}(b_j) \text{ NOT } (b_{j-1}) \qquad \text{eq. (8)}$$

$$aa_{1,-1} = a_i \text{ XOR } b_{j+1} \qquad \text{eq. (9)}$$

$$aa_2 = a_{i-1} \text{NOT}(b_{j+1}) \qquad \text{eq. (10)}$$

and $$aa_2 = \text{NOT}(a_{i-1}) b_{j+1} \qquad \text{eq. (11).}$$

It should be recognized that in the steady state, the logic state of the partial product bit $PPj_i$ depends on the logic state of $aa_{1,-1}$, $aa_2$, $aa_{-2}$, and on the logic state of $s_{1,-1}$, $s_2$, $s_{-2}$, where $aa_{1,-1}$, $aa_2$, $aa_{-2}$, and $s_{1,-1}$, $s_2$, $s_{-2}$, are intermediate signals. In this embodiment, the logic state of the signals $aa_{1,-1}$, $a_2$, $aa_{-2}$, depend only on one of the multiplicand bits (i.e., $a_i$ or $a_{i-1}$) and on a subset of the multiplier bits (i.e., the most significant multiplier bit $b_{j+1}$). The logic state of the signals $s_{1,-1}$, $s_2$, $s_{-2}$, depends only on a subset of the multiplier bits, (i.e., on the two least significant multiplier bits $b_j$ and $b_{j-1}$). The signals $s_{1,-1}$, $s_2$, $s_{-2}$ are referred to herein as select signals.

Referring now to FIG. 7B, the truth table has eleven columns. More specifically, the table has three columns for the multiplier bit inputs (multiplier bits $b_{j+1}$, $b_j$, $b_{j-1}$), six columns for the intermediate signals ($s_{1,-1}$, $s_2$, $s_{-2}$, $aa_{1,-1}$, $aa_2$, $aa_{-2}$), one column for the output from the partial product bit generators ($PPj_i$), and one column for output from the partial product generator (PPj). The table has eight rows, one for each possible combination of the multiplier bits $b_{j+1}$, $b_j$, $b_{j-1}$.

From the truth table, it can be seen that only one of the signals $s_{1,-1}$, $s_2$, $s_{-2}$, is asserted at any given time. That is, in the steady state, one of the signals $s_{1,-1}$, $s_2$, $s_{-2}$ has a logic state that is different than that of the other two. In view of this relationship, the signals $s_{1,-1}$, $s_2$, $s_{-2}$, are said to be orthogonal with respect to one another. Here, a 1 (i.e., a logic high state) is the asserted logic state, and a 0 (i.e., a logic low state) is the non-asserted logic state. However, some other embodiments may use a 0 as the asserted logic state, and 1 as the non-asserted logic state.

It can also be seen that each of the signals $s_{1,-1}$, $s_2$, $s_{-2}$ is associated with a respective one of the signals $a_{1,-1}$, $a_2$, $a_{-2}$. The logic state of the partial product bit $PPj_i$ depends on the logic state of the signal that is associated with the asserted select signal.

The partial product bit may be viewed as having a logic state equal to that of a signal selected from the following group: 0, $a_i$, NOT ($a_i$), $a_{i-1}$, NOT ($a_{-1}$). Note that the number of select signals is fewer than the number of signals in such group.

Figure 8:
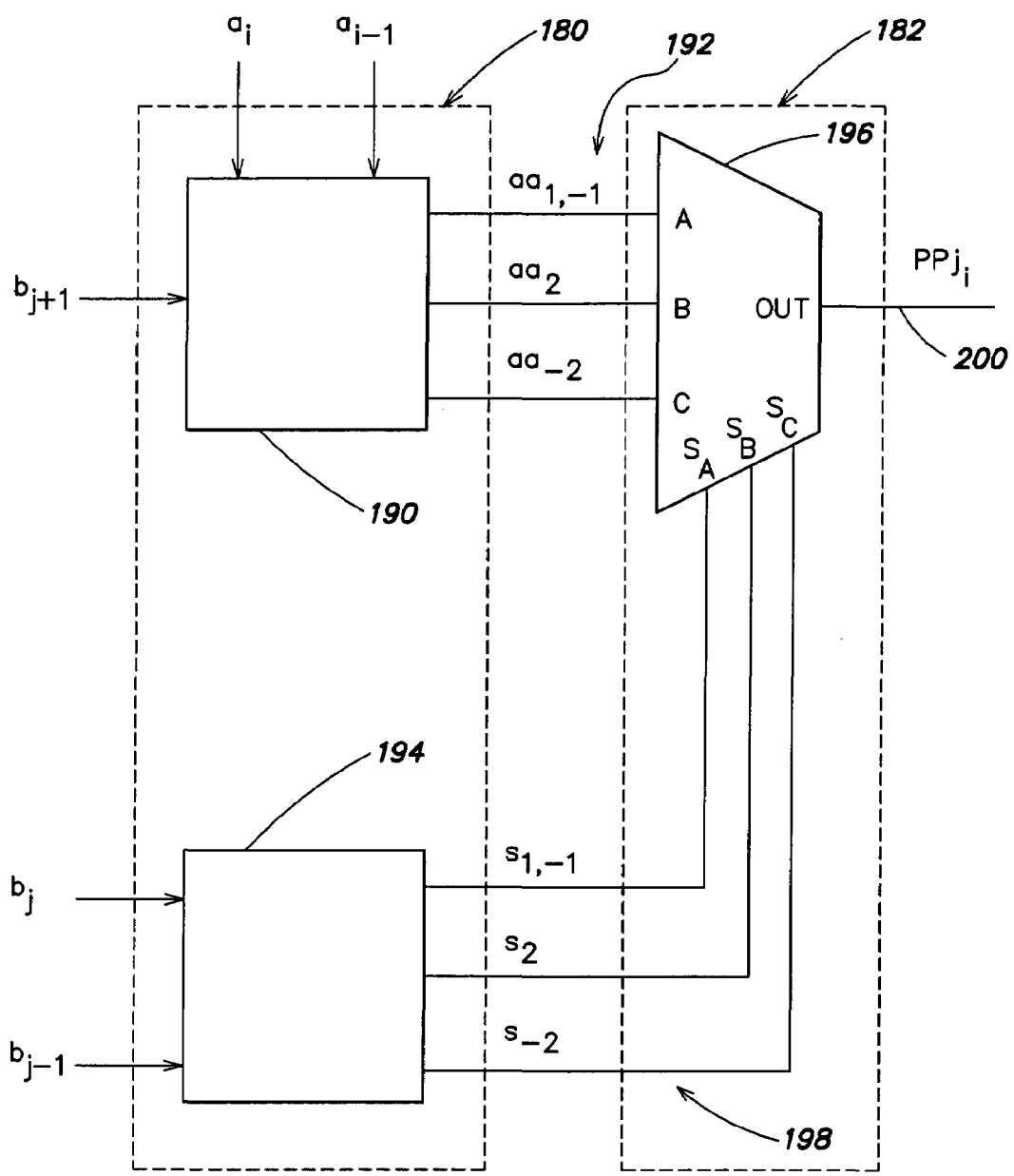
FIG. 8 is a block diagram for one embodiment of the partial product bit generator of FIG. 6.

FIG. 8 shows a block diagram for one implementation of a partial product bit generator in accordance with the logic equations and truth table of FIGS. 7A, 7B. This implementation has first and second stages, 180, 182, the second stage 182 being a selection stage.

The first stage 180 has two circuits 190, 194. The first one of these circuits 190 receives the signals $b_{j+1}$, $a_i$, $a_{i-1}$ and generates the intermediate signals $aa_{1,-1}$, $aa_2$, $aa_{-2}$. The second one of these circuits 194 receives the signals $b_j$, $b_{j-1}$ and generates the intermediate signals $s_{1,-1}$, $s_2$, $s_{-2}$ The second stage includes a multiplexer circuit 196, which has inputs A, B, C, $S_A$, $S_B$, $S_C$ and an output, out. The A, B, C, inputs of multiplexer 196 receive the $aa_{1,-1}$, $a_2$, $a_{-2}$ signals 192. The $S_A$, $S_B$, $S_C$, inputs receive the $s_{1,-1}$, $s_2$, $s_{-2}$ signals 198. The output of the multiplexer circuit 196, OUT, supplies the partial product bit $PPj_i$, on a line 200. The operation of multiplexer circuit 196 is as follows. If $s_{1,-1}$ is asserted, then the partial product bit $PPj_i$ has a logic state equal to the logic state of $aa_{1,-1}$. If $s_2$ is asserted, then the partial product bit $PPj_i$ has a logic state equal to the logic state of $aa_2$. If $s_{-2}$ is asserted, then the partial product bit $PPj_i$ has a logic state equal to the logic state of $aa_{-2}$.

FIG. 9 is a logic/circuit diagram for one embodiment of the circuits 190, 194, 196 (FIG. 8). In this embodiment of the circuit 190, the signal $b_{j+1}$ is supplied through a signal line 300 to a first input of an XOR gate 302. The signal $a_i$ is supplied through a signal line 304 to a second input of the XOR gate 302. The XOR gate 302 generates the signal $aa_{1,-1}$, which is supplied to the multiplexer circuit 196 through a signal line 306. The signal $b_{j+1}$ is also input to an inverter 308 that generates a signal NOT($b_{j+1}$), which is supplied through a signal line 310 to a first input of a first AND gate 312. The signal $a_{i-1}$ is supplied through a signal line 314 to a second input of the AND gate 312. The AND gate 312 generates the signal $aa_2$, which is supplied to the multiplexer circuit 196 through a signal line 316. The signal $b_{j+1}$ is also presented to a first input of a second AND gate 318. The second AND gate 318 has a second input that receives a signal NOT($a_{i-1}$), which is generated by an inverter 320 and supplied through a signal line 322. The AND gate 318 generates the signal $aa_{-2}$, which is supplied to the multiplexer circuit 196 through a signal line 324.

In this embodiment of the circuit 194, the signal $b_j$ is supplied through a signal line 326 to a first input of an XOR gate 328. The signal $b_{j-1}$ is supplied through a signal line 330 to a second input of the XOR gate 328. The XOR gate 328 generates the signal $s_{1,-1}$, which is presented to the multiplexer circuit 196 through a signal line 332. The signals $b_j$, $b_{j-1}$ are also supplied to inputs of a first AND gate 334. The AND gate 334 generates the signal $s_2$, which is supplied to the multiplexer circuit 196 through a signal line 336. The signals $b_j$, $b_{j-1}$ are further supplied to inverters 338 and 340, respectively. The inverters 338, 340 generate the signals NOT($b_j$), NOT($b_{j-1}$), which are supplied through signal lines 342, 344, respectively, to inputs of a second AND gate 346. The AND gate 346 generates the signal $s_{-2}$, which is supplied to the multiplexer circuit 196 through a signal line 348.

The multiplexer circuit 196 shown in FIG. 9 is made up of a pass transistor multiplexer. The pass transistor multiplexer has three transmission gates 350A, 350B, 350C. The three transmission gates are all identical to one another. Each transmission gate has an input terminal, an output terminal, and a control terminal. The output terminals of the transmission gates 350A–350C are all connected to one another. The input terminal of each of the transmission gates 350A–350C is supplied with one of the signals $aa_{1,-1}$, $aa_2$, $aa_{-2}$. The control terminal of each of the transmission gates 350A–350C is supplied with one of the signals $s_{1,-1}$, $s_2$, $s_{-2}$. More specifically, the signal $aa_{1,-1}$ is supplied to the input terminal of the transmission gate 350A. The signal $s_{1,-1}$ is supplied to the control terminal of the transmission gate 350A. The signal $aa_2$ is supplied to the input terminal of the transmission gate 350B. The signal $s_2$ is supplied to the control terminal of the transmission gate 350B. The signal $aa_{-2}$ is supplied to the input terminal of the transmission gate 350C. The signal $s_{-2}$ is supplied to the control terminal of the transmission gate 350C.

The transmission gates 350A–350C each operate as follows. If the signal on the control terminal is in an asserted state, then the transmission gate is in the "on" condition. If the signal on the control terminal is in a non asserted state, then the transmission gate is in the "off" condition. Because only one of the signals $s_{1,-1}$, $s_2$, $s_{-2}$ is asserted (in the steady state) at any given time, only one of the transmission gates will be "on" (in the steady state) at any given time.

It should be recognized that the embodiment of the partial product bit generator shown in FIG. 9 has only three levels of combinatorial logic. In particular, the first circuit has two levels of combinatorial logic (the XOR gate is made up of two levels of combinatorial logic). The second circuit has two levels of combinatorial logic (the XOR gate is made up of two levels of combinatorial logic), which are in parallel with the two levels of the first circuit. The third logic circuit has only one level of combinatorial logic (the pass transistor multiplexer makes us the one level of combinatorial logic). Thus, the longest delay path through the partial product bit generator is equal to that of an XOR gate in series with a pass transistor multiplexer. Note that the longest delay path through the first circuit 190 is substantially equal to the longest delay path through the second circuit 194. Thus, the propagation delay through the first circuit 190 will be substantially equal to that through the second circuit 194. The term "substantially equal" is used because, practical factors including, but not limited to, variations in the manufacturing process, will keep the delays from being exactly equal to one another.

Figure 5A:
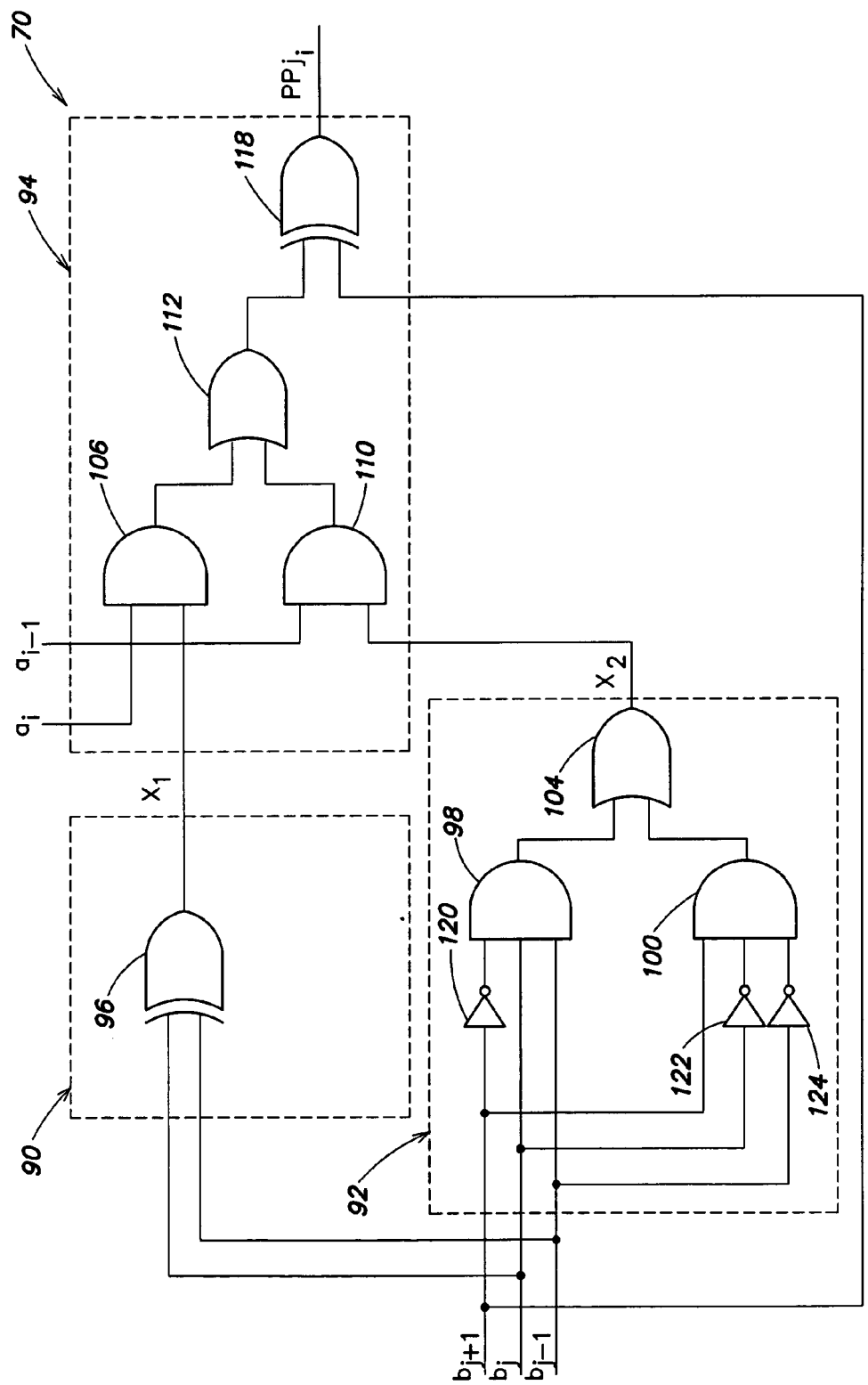
FIG. 5A is a block diagram for one implementation of the partial product bit generator of FIG. 3.
Figure 5B:
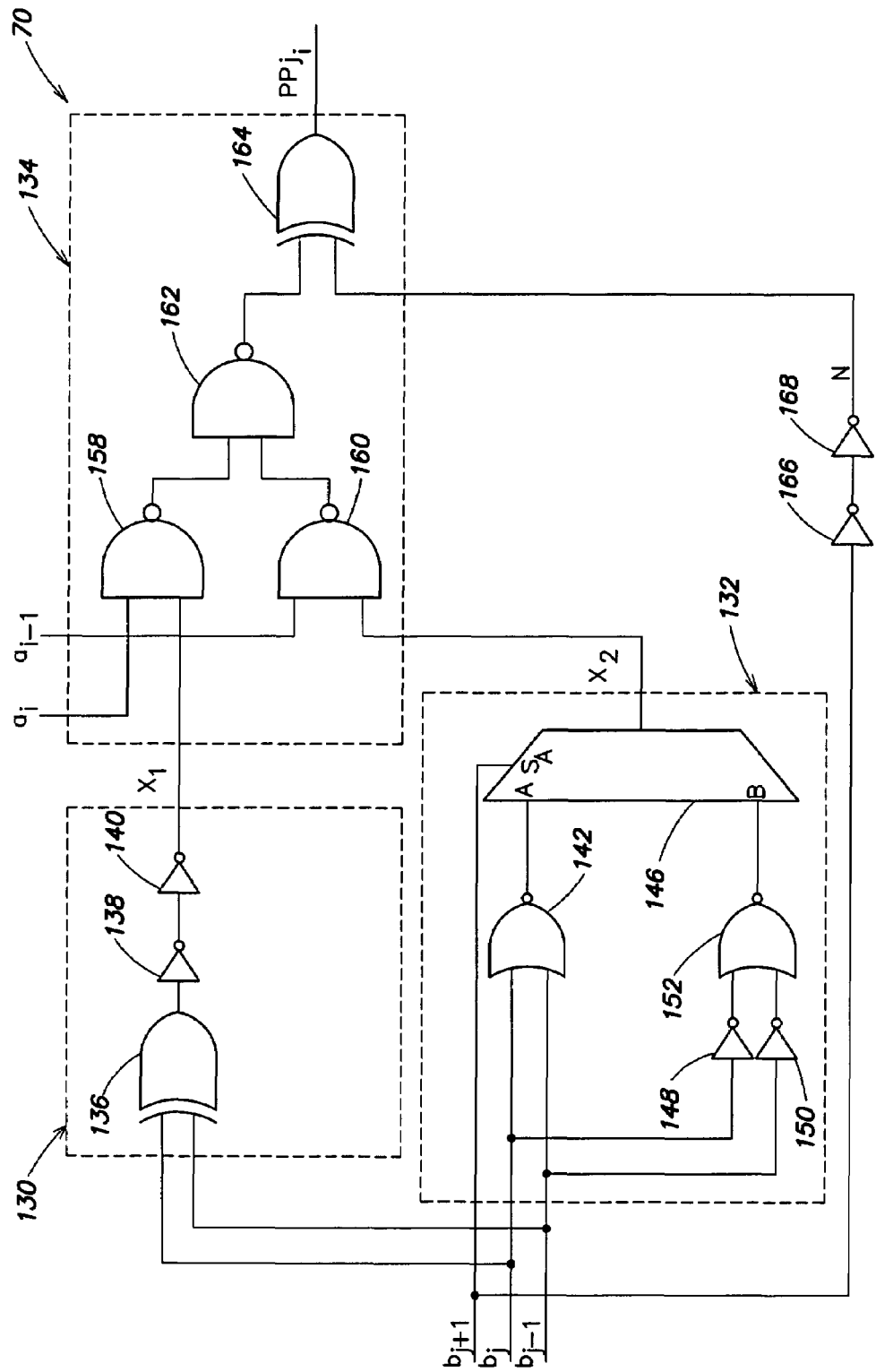
FIG. 5B is a block diagram for another implementation of the partial product bit generator of FIG. 3.

Thus, the partial product bit generator of FIG. 9 has three fewer levels of combinatorial logic that the prior art partial product bit generators of FIGS. 5A, 5B. (As stated above, the prior art partial product bit generators shown in FIGS. 5A, 5B have six levels of combinatorial logic.) This means that for a given technology, the delay through the partial product bit generator shown in FIG. 9 will be roughly one half as much as the delay through the partial product bit generators shown in FIGS. 5A, 5B. Reducing the delay by a factor of one half may significantly increase the speed of a multiplier. The magnitude of the increase in the speed of the multiplier depends on how large a proportion of the multiplier delay is attributed to the delay of the partial product bit generators. For example, in one embodiment, substituting the partial product bit generator of FIG. 9 for the prior art partial product bit generators of FIGS. 5A, 5B results in a ten percent increase in the speed of the multiplier.

The ability to increase the speed of a multiplier has several advantages. For example, it is known that a multiplier is the bottleneck in some data processor systems. In such systems, increasing the speed of the multiplier can improve the system performance. In addition, in a situation where a multiplier is not fast enough to meet system requirements, system designers are often forced to add additional multiplier(s) and/or switch to a faster technology (e.g., from 1.8µ CMOS technology to 1.3µ CMOS technology). Unfortunately, adding additional multiplier(s) can increase the size and/or the power consumption of the data processor. Furthermore, adding multiplier(s) and/or switching to a faster technology may have an adverse effect on the cost and/or delivery schedule of a product. However, the ability to increase the speed of a multiplier may be enough, in some situations, to enable system designers to meet the system requirements without the need to add additional multipliers and/or switch to a faster technology. Eliminating the need to add additional multipliers and/or switch to a faster technology may help reduce the cost, size and/or power consumption of a data processor system.

There are additional potential advantages as to data processor systems that have more than one multiplier. Being able to increase the speed of one or more of the multipliers may be enough, in some situations, to enable system designers to eliminate one or more of the multipliers, with corresponding reductions in size and/or power requirements, while still meeting the system requirements. For example, if a data processor has four multipliers, increasing the speed of each multipliers by ten percent could increase the total multiplier throughput by an amount equal to forty percent of the throughput of one multiplier. This could be enough of an increase to enable system designers to eliminate one of the multipliers. Furthermore, if a data processor has ten multipliers, increasing the speed of each multiplier by ten percent could increase the total multiplier throughput by an amount equal to that which would be provided by adding another multiplier.

One reason that the embodiment of FIG. 9 can be implemented in only three levels of combinatorial logic is that the intermediate signals in this embodiment are able to be generated concurrently, in the two levels of combinatorial logic of the first and second circuits. The partial product bit $PPj_i$ is then able to be generated from the intermediate signals using the one level of combinatorial logic in the third circuit. Thus, unlike the methodology used in the prior art partial product bit generators shown in FIGS. 5A, 5B, a long series of combinatorial logic operations is not required.

It should be recognized however, that the present invention is not limited to the embodiments shown above. Nor is there any requirement that a partial product bit generator be implemented in only three levels of combinatorial logic. Indeed, any number of levels of combinatorial logic may be employed. Note that implementations with four or five levels of combinatorial logic may still provide various degrees of improvement over the prior art.

It should be further recognized that there is no requirement that any embodiment of any aspect of the present invention provide any of the advantages described above (e.g., to help reduce size, cost and/or power requirements) or even address any of the shortcomings of the prior art.

It should be recognized that circuits for implementing the individual combinatorial logic operations shown in FIG. 9 are well known. Those skilled in the art will recognize that each implementation has advantages and disadvantages. Suitable choices for any given embodiment will depend on the specific requirements for the embodiment, e.g., speed, power, size, etc.

FIG. 10 shows one embodiment of the transmission gates 350A–350C. In this embodiment, the input terminal ("in") of the transmission gate is connected to a source terminal 354 of a p-channel MOSFET 356 and a source terminal 358 of an n-channel MOSFET 360. The control terminal ("control") of the transmission gate is connected to a gate 362 of the n-channel MOSFET 360 and supplied to an inverter 364, which generates a signal $NOT(s_{1,-1})$ supplied to a gate 366 of the p-channel MOSFET 356. The drain 368 of the p-channel MOSFET 356 and the drain 370 of the n-channel MOSFET 360 are connected to the output terminal ("out") of the transmission gate.

One or more of the embodiments of the booth-encoded partial product bit generator 170 of FIG. 6 may be used to form booth-encoded partial product generators, which in turn may be used to form booth-encoded multipliers.

Figure 11:
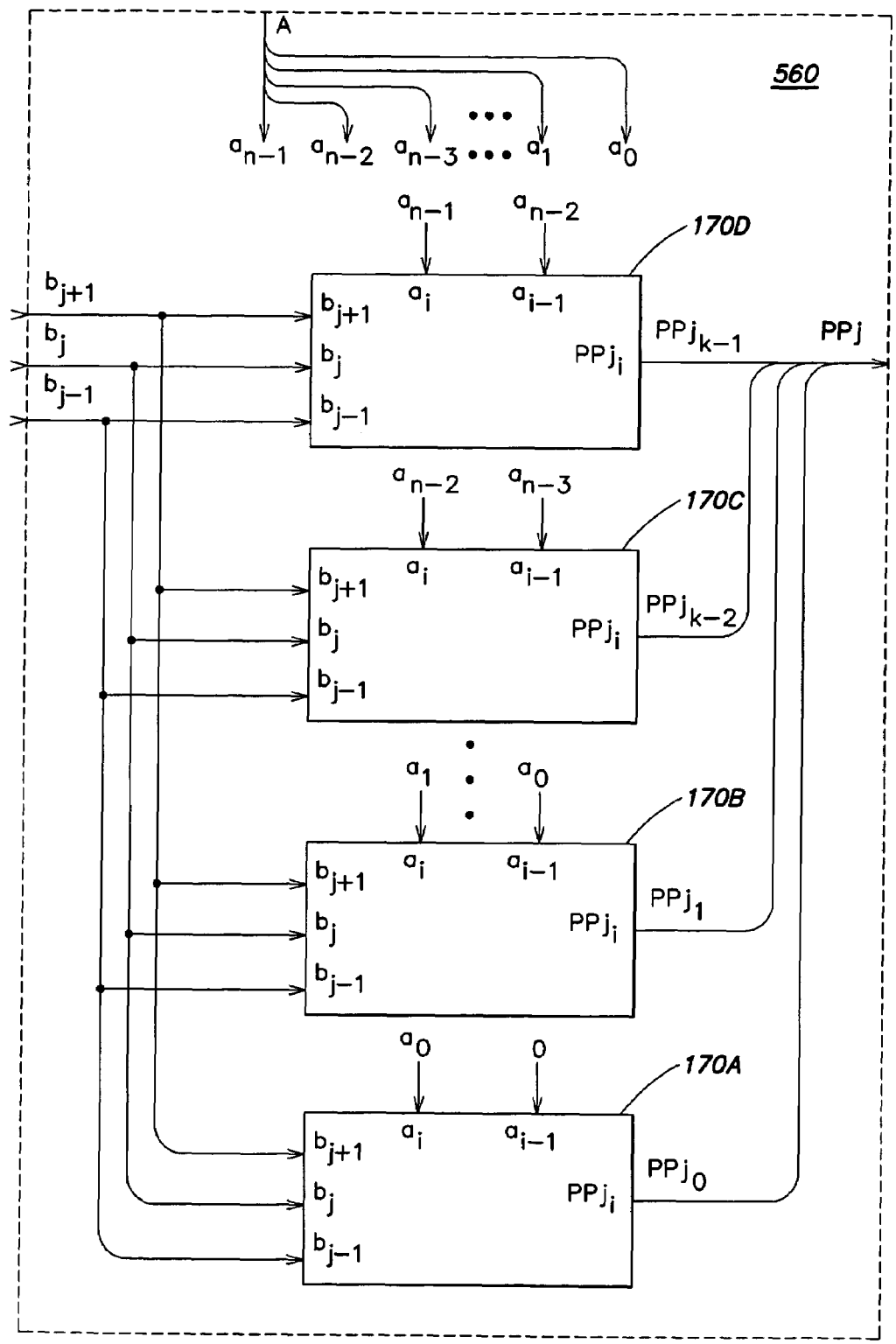
FIG. 11 shows one embodiment of a new booth-encoded partial product generator, which includes a plurality of partial product bit generators of FIG. 6.

FIG. 11 shows one embodiment of a new booth-encoded partial product generator 560, which includes a plurality of partial product bit generators each identical to the partial product bit generator 170 (FIG. 6).

Figure 2:
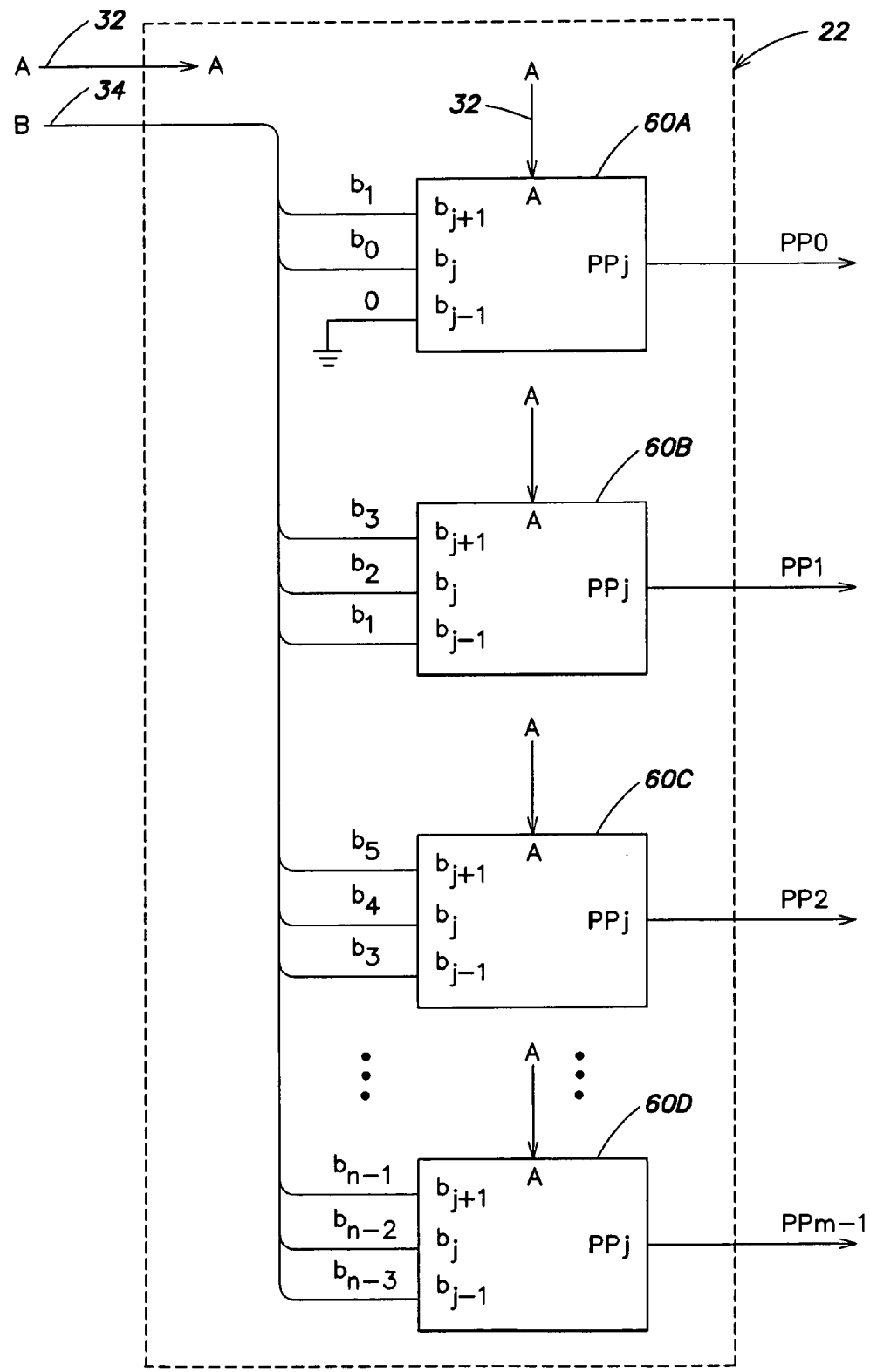
FIG. 2 is a block diagram of the booth-encoded partial product generator unit shown in FIG. 1.

As with the partial product generators 60A–60D (FIGS. 2–3), the partial product generator 560 has two sets of inputs and one output. The first set of inputs is indicated by A. The second set of inputs is indicated by $b_{j+1}$, $b_j$, $b_{j-1}$. The output is indicated by PPj. As indicated above, for a given set of signals received at the inputs A, $b_{j+1}$, $b_j$, $b_{j-1}$, the partial product PPj generated by the partial product generator 560 is substantially equivalent to the partial product PPj (FIG. 3) that would be generated by the partial product generators 60A–60D (FIGS. 2–3). For a given set of inputs, the output of the partial product generator 560 is substantially equivalent to that which would be produced by the partial product generators 60A–60D (FIGS. 2–3).

In this embodiment, the partial product generator 560 has k partial product bit generators in all, four of which are shown, i.e., 170A–170D. The partial product bit generator 170A receives bits $b_{j+1}$, $b_j$, $b_{j-1}$ of the multiplier B and receives bit $a_0$ of the multiplicand A and generates bit $PPj_0$ of the partial product PPj. The partial product bit generator 170B receives bits $b_{j+1}$, $b_j$, $b_{j-1}$ of the multiplier B and bits $a_1$, $a_0$ of the multiplicand A and generates bit $PPj_1$ of the partial product PPj. The partial product bit generator 170C receives bits $b_{j+1}$, $b_j$, $b_{j-1}$ of the multiplier B and bits $a_{n-2}$, $a_{n-3}$ of the multiplicand A and generates bit $PPj_{k-2}$ of the partial product PPj. The partial product bit generator 170D receives bits $b_{j+1}$, $b_j$, $b_{j-1}$ of the multiplier B and bits $a_{n-1}$, $a_{n-2}$ of the multiplicand A and generates bit $PPj_{k-1}$ of the partial product PPj.

Figure 12:
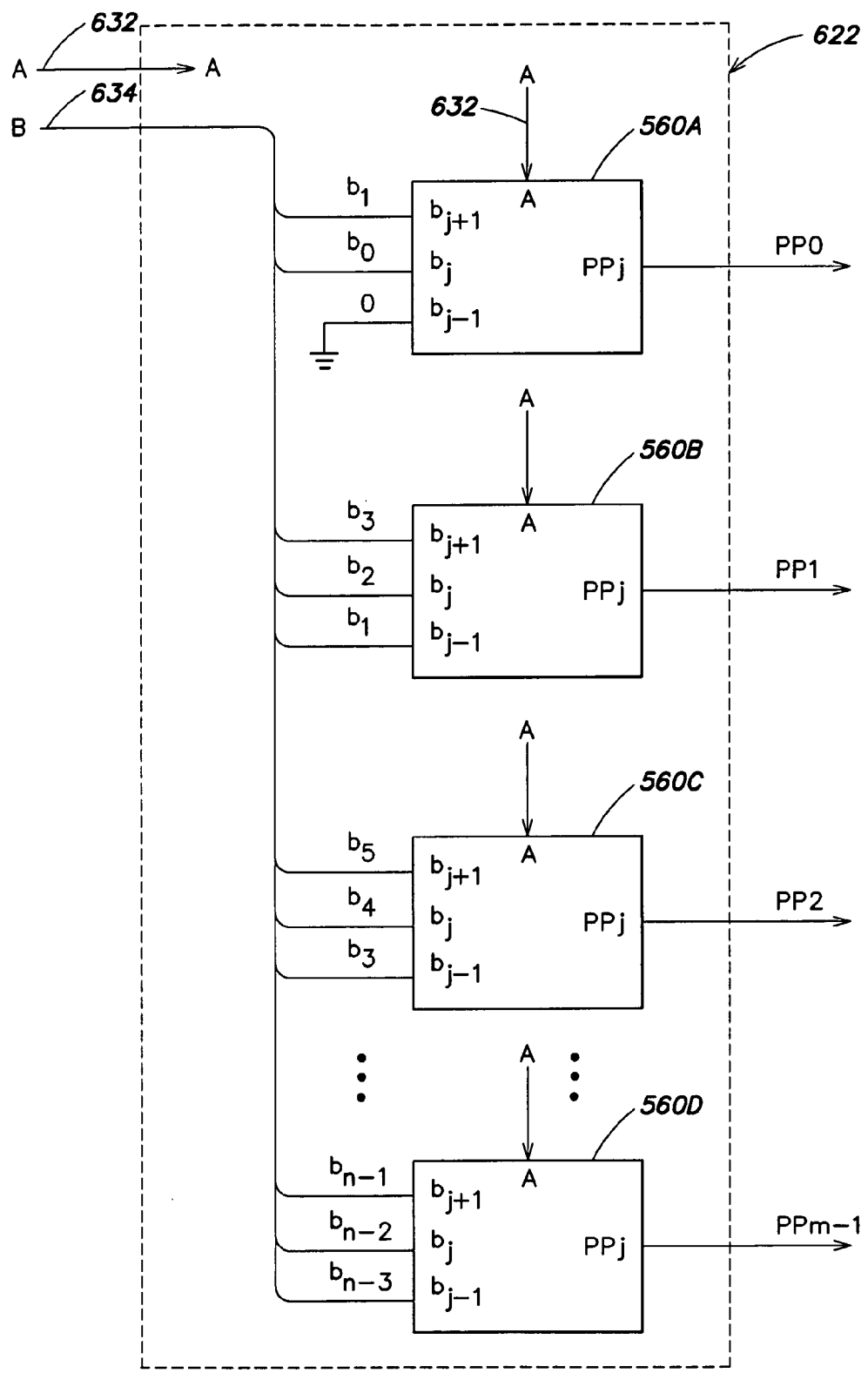
FIG. 12 shows one embodiment of a new booth-encoded partial product generator unit, which includes a plurality of partial product generators of FIG. 11.

FIG. 12 shows one embodiment of a new booth-encoded partial product generator unit 622, which includes a plurality of partial product generators each identical to the partial product bit generator 560 (FIG. 11).

Figure 1:
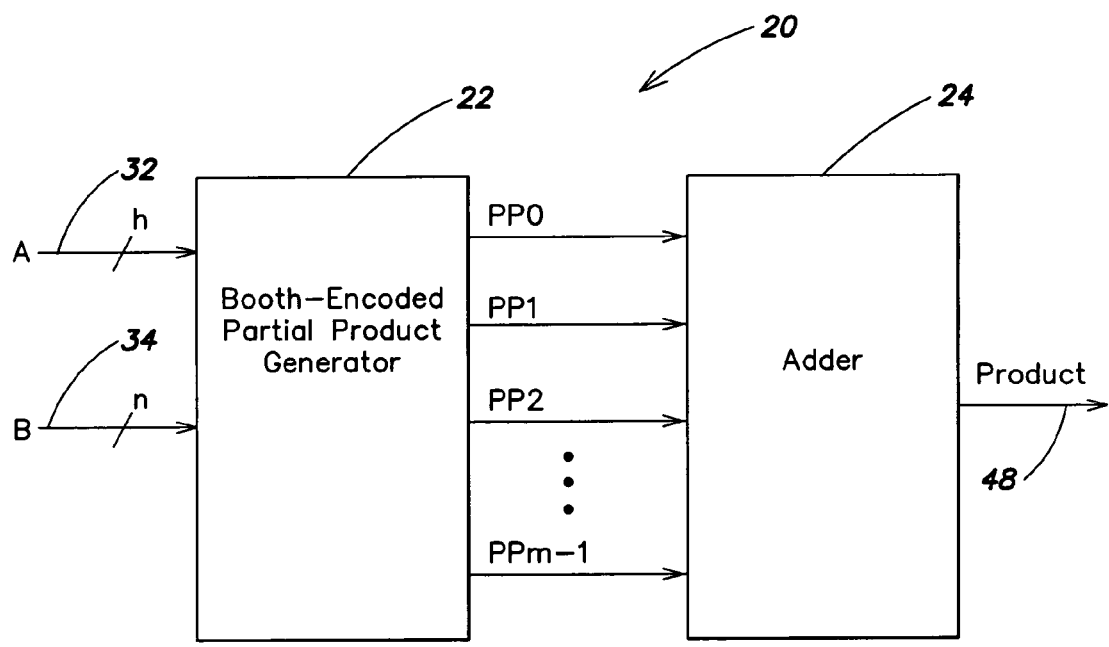
FIG. 1 shows an example of a prior art booth-encoded multiplier.

As with the partial product generator unit 22 (FIGS. 1–2), the partial product generator unit 622 receives the multiplicand A and the multiplier B, for example through operand buses 632, 634 respectively, and generates a plurality of partial products PP0–PPm-1. Each of the partial products may be a multi-bit digital signal. For example, the partial product PP0 may have bits $PP0_{k-1}$, $PP0_{k-2}$, ... $PP0_1$, $PP0_0$, where bit $PP0_{k-1}$ is the MSB and bit $PP0_0$ is the LSB. For a given set of inputs, the output of the partial product generator unit 622 is substantially equivalent to that which would be produced by the partial product generator unit 22 (FIGS. 1–2).

In this embodiment, the partial product generator unit 622 has m partial product generators in all, four of which are shown, i.e., 560A, 560B, 560C and 560D. Note that m is often equal to n divided by two. The partial product generator 560A receives the multiplicand A and multiplier bits $b_1$, $b_0$ (input $b_{j-1}$ is supplied with "0", i.e., a signal having a logic low state), and generates the partial product PP0. The partial product generator 560B receives the multiplicand A and bits $b_3$, $b_2$, $b_1$ of the multiplier B, and generates the partial product PP1. The partial product generator 560C receives the multiplicand A and bits $b_5$, $b_4$, $b_3$ of the multiplier B and generates the partial product PP2. The partial product generator 560D receives the multiplicand A and bits $b_{n-1}$, $b_{n-2}$, $b_{n-3}$ of the multiplier B and outputs the partial product PPm-1.

Figure 13:
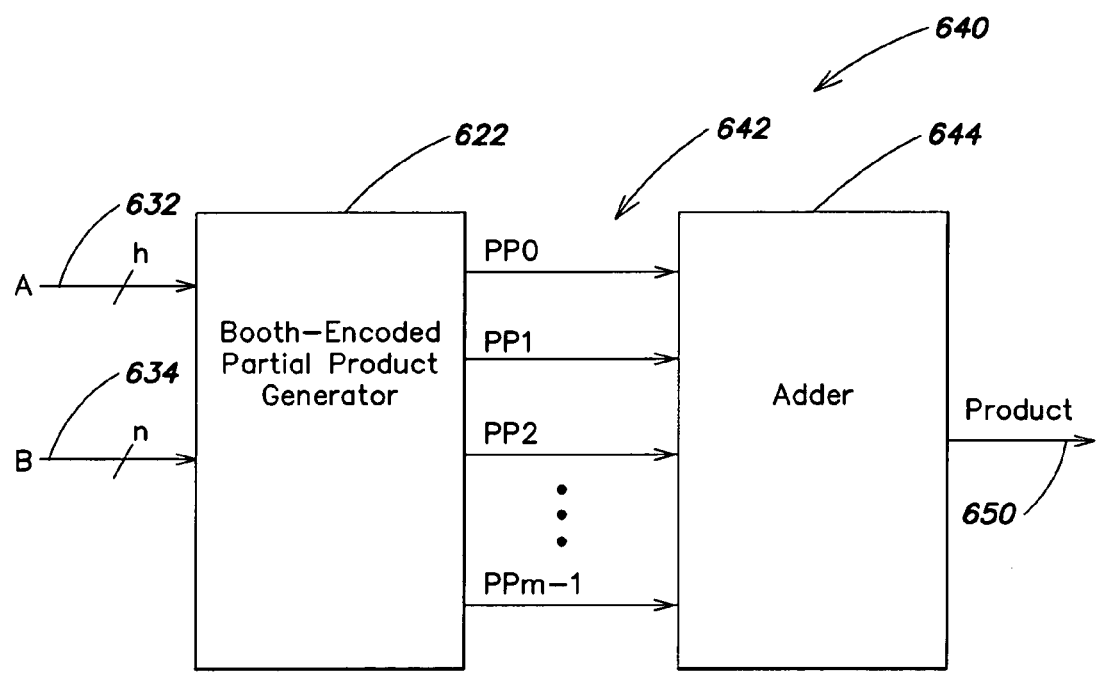
FIG. 13 shows one embodiment of a booth-encoded multiplier that employs the booth-encoded partial product generator unit of FIG. 12.

FIG. 13 shows one embodiment of a booth-encoded multiplier 640 that employs the booth-encoded partial product generator unit 622 (FIG. 12). In this embodiment, the partial products PP0–PPm-1 are supplied through data buses 642 to an adder 644, which may be identical to the adder 24 shown in FIG. 1. The output of the adder 644 is the product, which is supplied on a data bus 650.

While there have been shown and described various embodiments, it will be understood by those skilled in the art that the present invention is not limited to such embodiments, which have been presented by way of example only, and that various changes and modifications may be made without departing from the spirit and scope of the invention. For example, it should also be understood that the present invention is not limited to the logic equations, truth table, or circuit implementations described above, nor is the present invention limited to radix 4 implementations. Accordingly, the invention is limited only by the appended claims and equivalents thereto.

The invention claimed is:

1. A partial product bit generator circuit for use in performing multiplication to generate a product of a multiplicand and a multiplier, the multiplicand being represented by a digital signal having a plurality of bits, the multiplier being represented by a digital signal having a plurality of bits, the partial product bit generator circuit receiving a group of the multiplicand bits and a group of the multiplier bits and providing a partial product bit in response thereto, wherein the partial product bit generator circuit comprises less than six levels of combinatorial logic and further comprises:
   a first circuit, responsive to a group of the multiplicand bits and a first subset of a group of the multiplier bits, to output at least three digital signals;
   a second circuit, responsive to a second subset of the group of multiplier bits, to output at least three select signals, each of the at least three select signals being associated with a respective one of the at least three digital signals, only one of the at least three select signals having a logic state that is asserted; and
   a third circuit, to output a partial product bit in response to the digital signal that is associated with the select signal having the asserted logic state.

2. The partial product bit generator circuit of claim 1 wherein the third circuit comprises less than four levels of combinatorial logic.

3. The partial product bit generator circuit of claim 1 wherein the third circuit comprises only one level of combinatorial logic.

4. A partial product bit generator circuit as in any of claim 2 or 3 wherein the first circuit and the second circuit each comprise only two levels of combinatorial logic.

5. The partial product bit generator circuit of claim 1 wherein the partial product bit generator comprises less than five levels of combinatorial logic.

6. The partial product bit generator circuit of claim 1 wherein the partial product bit generator comprises less than four levels of combinatorial logic.

7. The partial product bit generator circuit of claim 1 wherein the partial product bit generator comprises exactly three levels of combinatorial logic.

8. The partial product bit generator circuit of claim 1 wherein a longest delay path through the partial product bit generator circuit is substantially equivalent to an XOR gate and a three input pass transistor multiplexer.

9. A method for use in performing multiplication to generate a product of a multiplicand and a multiplier, the multiplicand being represented by a digital signal having a plurality of bits, the multiplier being represented by a digital signal having a plurality of bits, the method comprising:
   receiving a group of the multiplicand bits;
   receiving a group of the multiplier bits;
   generating a partial product bit signal in response to the group of multiplicand bits and the group of multiplier bits using less than six levels of combinatorial logic, wherein generating comprises:
   generating at least three digital signals in response to the group of multiplicand bits and a first subset of the group of multiplier bits;
   generating at least three select signals in response to a second subset of the group of multiplier bits, each of the at least three select signals being associated with a respective one of the at least three digital signals, only one of the select signals having a logic state that is asserted; and
   generating a partial product bit in response to the digital signal associated with the select signal having the asserted logic state.

10. The method of claim 9 wherein generating comprises generating a partial product bit signal in response to the group of multiplicand bits and the group of multiplier bits using less than five levels of combinatorial logic.

11. The method of claim 9 wherein generating comprises generating a partial product bit signal in response to the group of multiplicand bits and the group of multiplier bits using less than four levels of combinatorial logic.

12. The method of claim 9 wherein generating comprises generating a partial product bit signal in response to the group of multiplicand bits and the group of multiplier bits using exactly three levels of combinatorial logic.

13. A method for use in performing multiplication to generate a product of a multiplicand and a multiplier, the multiplicand being represented by a plurality of bits, the multiplier being represented by a plurality of bits, the method comprising:
   receiving a group of the multiplicand bits;
   receiving a group of the multiplier bits;
   generating at least three digital signals in response to the group of multiplicand bits and a first subset of the group of multiplier bits;
   generating at least three select signals in response to a second subset of the group of multiplier bits, each of the at least three select signals being associated with a respective one of the at least three digital signals, only one of the select signals having a logic state that is asserted; and
   generating a partial product bit in response to the digital signal associated with the select signal having the asserted logic state.

14. The method of claim 13 wherein the generating of the at least three digital signals is performed concurrent with the generating of the set of at least three select signals.

15. The method of claim 13 wherein the first subset of the group of multiplier bits is not equal to the second subset of the group of multiplier bits.

16. The method of claim 15 wherein the first subset of the group of multiplier bits includes only a most significant bit of the group of multiplier bits.

17. The method of claim 16 wherein the second subset of the group of multiplier bits includes all of the group of multiplier bits except for a most significant bit of the group of multiplier bits.

18. The method of claim 17 wherein the group of multiplier bits comprises exactly three multiplier bits.

19. The method of claim 18 wherein the group of multiplicand bits comprises exactly two bits, the at least three digital signals comprise exactly three digital signals, and the at least three select signals comprise exactly three select signals.

20. The method of claim 15 wherein the second subset of the group of multiplier bits includes all of the group of multiplier bits except for a most significant bit of the group of multiplier bits.

21. The method of claim 13 wherein generating a partial product bit comprises:
   selecting the digital signal that is associated with the select signal having the asserted logic state; and
   generating the partial product bit in response to the selected digital signal.

22. The method of claim 21 wherein generating the partial product bit in response to the selected digital signal comprises generating a partial product bit having a logic state that is equal to that of the selected digital signal.

23. The method of claim 13 wherein the group of multiplier bits comprises exactly three multiplier bits, $b_{j+1}$, $b_j$, $b_{j-1}$, the group of multiplicand bits comprises exactly two bits, $a_i$, $a_{i-1}$, the at least three digital signals comprise exactly three digital signals, $aa_{1,-1}$, $aa_2$, $aa_{-2}$, and the at least three select signals comprise exactly three select signals, $s_{1,-1}$, $s_2$, $s_{-2}$, and wherein the digital signal $aa_{1,-1}$ has a logic state equal to the logic state of $a_i$ XOR $b_{j+1}$, the digital signal $aa_2$ has a logic state equal to the logic state of $a_{i-1}$ NOT $(b_{j+1})$, and the digital signal $aa_{-2}$ has a logic state equal to the logic state of NOT$(a_{i-1})$ $b_{j+1}$.

24. The method of claim 23 wherein the select signal $s_{1,-1}$ has a logic state equal to the logic state of $b_j$ XOR $b_{j-1}$, the select signal $s_2$ has a logic state equal to the logic state of $b_j$ $b_{j-1}$, and the select signal $s_{-2}$ has a logic state equal to the logic state of NOT$(b_j)$ NOT $(b_{j-1})$.

25. The method of claim 24 wherein the partial product bit has a logic state equal to the logic state of $s_{1,-1}$ $aa_{1,-1}$+$s_2 aa_2$+$s_2 aa_{-2}$.

26. Apparatus for use in performing multiplication to generate a product of a multiplicand and a multiplier, the multiplicand being represented by a digital signal having a plurality of bits, the multiplier being represented by a digital signal having a plurality of bits, the apparatus comprising:
   a first circuit, responsive to a group of the multiplicand bits and a first subset of a group of the multiplier bits, to output at least three digital signals;
   a second circuit, responsive to a second subset of the group of multiplier bits, to output at least three select signals, each of the at least three select signals being associated with a respective one of the at least three digital signals, only one of the at least three select signals having a logic state that is asserted; and
   a third circuit, to output a partial product bit in response to the digital signal that is associated with the select signal having the asserted logic state.

27. The apparatus of claim 26 wherein the first subset of the group of multiplier bits is not equal to the second subset of the group of multiplier bits.

28. The apparatus of claim 27 wherein the group of multiplier bits comprises exactly three bits, the first subset of the group of multiplier bits includes only a most significant bit of the group of multiplier bits, and the second subset of the group of multiplier bits includes all of the group of multiplier bits except for a most significant bit of the group of multiplier bits.

29. The apparatus of claim 26 wherein the group of multiplier bits comprises exactly three multiplier bits, $b_{j+1}$, $b_j$, $b_{j-1}$, the group of multiplicand bits comprises exactly two bits, $a_i$, $a_{i-1}$, the at least three digital signals comprise exactly three digital signals, $aa_{1-1}$, $aa_2$, $aa_{-2}$, and the at least three select signals comprise exactly three select signals, $s_{1,-1}$, $s_2$, $s_{-2}$, the digital signal $aa_{1,-1}$ has a logic state equal to the logic state of $a_i$ XOR $b_{j+1}$, the digital signal $aa_2$ has a logic state equal to the logic state of $a_{-1}$NOT$(b_{j+1})$, and the digital signal $aa_{-2}$ has a logic state equal to the logic state of NOT$(a_{i-1})$ $b_{j+1}$, the select signal $s_{1,-1}$ has a logic state equal to the logic state of $b_j$ XOR $b_{j-1}$, the select signal $s_2$ has a logic state equal to the logic state of $b_j$ $b_{j-1}$, the select signal $s_{-2}$ has a logic state equal to the logic state of NOT$(b_j)$ NOT $(b_{j-1})$, and the partial product bit has a logic state equal to the logic state of $s_{1,-1}$ $aa_{1,-1+s2}aa_2$+$s_{-2}aa_{-2}$.

30. The apparatus of claim 26 wherein the first circuit and the second circuit have substantially the same propagation delay as one another.

31. The apparatus of claim 26 wherein the longest logic path through the first circuit and the second circuit is substantially equal to an XOR gate.

32. The apparatus of claim 26 wherein the third circuit comprises a pass-transistor multiplexer, responsive to the at least three select signals, to output the digital signal that is associated with the select signal having the asserted logic state.

33. A partial product bit generator circuit for use in performing multiplication to generate a product of a multiplicand and a multiplier, the multiplicand being represented by a digital signal having a plurality of bits, the multiplier being represented by a digital signal having a plurality of bits, the partial product bit generator circuit receiving a group of the multiplicand bits and a group of the multiplier bits, the partial product bit generator circuit comprising:

a first circuit, responsive to the group of multiplicand bits and a first subset of the group of multiplier bits, to output a first set of output signals;

a second circuit, responsive to a second subset of the group of multiplier bits to output a second set of output signals, the second subset of the group of multiplier bits being disjoint from the first subset of the group of multiplier bits ; and a third circuit, responsive to the first set of output signals and the second set of output signals to output a partial product bit signal.

34. The partial product bit generator circuit of claim 33 wherein the third circuit is responsive only to the first set of output signals and the second set of output signals.

35. The partial product bit generator circuit of claim 34 wherein the first circuit and the second circuit operate concurrent with one another.

36. The partial product bit generator circuit of claim 35 wherein the first circuit and the second circuit have about the same propagation delay.

37. The partial product bit generator circuit of claim 34 wherein the first circuit and the second circuit have about the same propagation delay.

38. The partial product bit generator circuit of claim 33 wherein the first circuit and the second circuit operate concurrent with one another.

39. The partial product bit generator circuit of claim 33 wherein the first circuit and the second circuit have about the same propagation delay.

40. A method for use in performing multiplication to generate a product of a multiplicand and a multiplier, the multiplicand being represented by a digital signal having a plurality of bits, the multiplier being represented by a digital signal having a plurality of bits, the method comprising:

receiving a group of the multiplicand bits;

receiving a group of the multiplier bits;

generating a first set of output signals in response to the group of multiplicand bits and a first subset of the group of multiplier bits;

generating a second set of output signals in response to a second subset of the group of multiplier bits, the second subset of the group of multiplier bits being disjoint from the first subset of the group of multiplier bits; and generating a partial product bit signal in response to the first set of output signals and the second set of output signals.

41. An apparatus for use in performing multiplication to generate a product of a multiplicand and a multiplier, the multiplicand being represented by a plurality of bits, the multiplier being represented by a plurality of bits, the method comprising:

means for generating at least three digital signals in response to a group of the multiplicand bits and a first subset of a group of multiplier bits;

means for generating at least three select signals in response to a second subset of the group of multiplier bits, each of the at least three select signals being associated with a respective one of the at least three digital signals, only one of the select signals having a logic state that is asserted; and means for generating a partial product bit in response to the digital signal associated with the select signal having the asserted logic state.

42. A partial product bit generator for use in performing multiplication to generate a product of a multiplicand and a multiplier, the multiplicand being represented by a digital signal having a plurality of bits, the multiplier being represented by a digital signal having a plurality of bits, the partial product bit generator circuit receiving a group of the multiplicand bits and a group of the multiplier bits, the partial product bit generator circuit comprising:

means for generating a first set of output signals in response to the group of multiplicand bits and a first subset of the group of multiplier bits;

means for generating a second set of output signals in response to a second subset of the group of multiplier bits, the second subset of the group of multiplier bits being disjoint from the first subset of the group of multiplier bits; and means for generating a partial product bit signal in response to the first set of output signals and the second set of output signals.

43. A partial product bit generator that receives three multiplier bits, $b_{j+1}$, $b_j$, $b_{j-1}$, and two multiplicand bits, $a_i$, $a_{i-1}$, and outputs a partial product bit, wherein a longest delay path through the partial product bit generator circuit is substantially equivalent to an XOR gate and a three input pass transistor multiplexer.

* * * * *

UNITED STATES PATENT AND TRADEMARK OFFICE
CERTIFICATE OF CORRECTION

PATENT NO. : 7,024,445 B2  Page 1 of 1
APPLICATION NO. : 10/039867
DATED : April 4, 2006
INVENTOR(S) : Jieming Qi It is certified that error appears in the above-identified patent and that said Letters Patent is hereby corrected as shown below:

In the Claims:

In claim 4, col. 14, line 22, change 'claim' to "claims".

In claim 25, col. 16, line 11, change '$s_2 aa_{-2}$' to "$s_{-2} aa_{-2}$".

In claim 29, col. 16, line 42, change '$a_i,{}_{i-1}$' to "$a_i, a_{i-1}$".

In claim 29, col. 16, line 43, change '$aa_{1-1}$' to "$aa_1, \_1$".

In claim 29, col. 16, line 47, change '$a_{-1} NOT(b_{j+1})$' to "$a_{i-1} NOT(b_{j+1})$".

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,024,445 B2  
APPLICATION NO. : 10/039867  
DATED : April 4, 2006  
INVENTOR(S) : Jieming Qi Page 1 of 1

It is certified that error appears in the above-identified patent and that said Letters Patent is hereby corrected as shown below:

In the Claims:

In claim 4, col. 14, line 22, change "claim" to --claims--.

In claim 25, col. 16, line 11, change "$s_2 aa_{-2}$" to --$s_{-2} aa_{-2}$--.

In claim 29, col. 16, line 42, change "$a_i, {}_{i-1}$" to --$a_i, a_{i-1}$--.

In claim 29, col. 16, line 43, change "$aa_{1-1}$" to --$aa_1, {}_{-1}$--.

In claim 29, col. 16, line 47, change "$a_{-1} NOT(b_{j+1})$" to --$a_{i-1} NOT(b_{j+1})$--.

This certificate supersedes Certificate of Correction issued August 22, 2006.

Signed and Sealed this

Twenty-first Day of November, 2006

JON W. DUDAS  
*Director of the United States Patent and Trademark Office*